(12) United States Patent
Rothschild et al.

(10) Patent No.: US 12,182,285 B2
(45) Date of Patent: Dec. 31, 2024

(54) SYSTEM AND METHOD FOR ENCRYPTED STORAGE OF CONSTRUCTED DATA

(71) Applicant: Dell Products L.P., Round Rock, TX (US)

(72) Inventors: Seth Jacob Rothschild, Littleton, MA (US); Michael Thomas Krużewski, Worcester, MA (US)

(73) Assignee: Dell Products L.P., Round Rock, TX (US)

( * ) Notice: Subject to any disclaimer, the term of this patent is extended or adjusted under 35 U.S.C. 154(b) by 255 days.

(21) Appl. No.: 17/845,059

(22) Filed: Jun. 21, 2022

(65) Prior Publication Data

US 2023/0409722 A1   Dec. 21, 2023

(51) Int. Cl.
  *G06F 21/62*  (2013.01)
  *G06F 12/14*  (2006.01)
  *G06F 21/60*  (2013.01)

(52) U.S. Cl.
  CPC ...... *G06F 21/6209* (2013.01); *G06F 12/1408* (2013.01); *G06F 21/602* (2013.01); *G06F 21/6218* (2013.01)

(58) Field of Classification Search
  CPC ............. G06F 21/6209; G06F 12/1408; G06F 21/602; G06F 21/6218; G06F 21/6227
  See application file for complete search history.

(56) References Cited

U.S. PATENT DOCUMENTS

| | | | | |
|---|---|---|---|---|
| 6,490,353 | B1* | 12/2002 | Tan | H04L 9/16 380/278 |
| 9,529,733 | B1* | 12/2016 | Sokolov | H04L 9/0825 |
| 2005/0144470 | A1* | 6/2005 | Takashima | G11B 20/00507 713/189 |
| 2006/0077034 | A1* | 4/2006 | Hillier | G07F 7/1008 340/5.61 |
| 2007/0107063 | A1* | 5/2007 | Eckleder | G06F 21/10 726/27 |
| 2010/0272255 | A1* | 10/2010 | Devadas | H04L 9/0877 713/1 |
| 2014/0115342 | A1* | 4/2014 | Ueda | H04L 9/3236 713/187 |
| 2014/0136855 | A1* | 5/2014 | Ducharme | G06F 21/79 713/193 |
| 2014/0189351 | A1* | 7/2014 | Steely | G06F 21/608 713/168 |
| 2018/0212769 | A1* | 7/2018 | Novak | G06F 21/53 |
| 2018/0322068 | A1* | 11/2018 | Lin | G06F 12/1408 |

\* cited by examiner

*Primary Examiner* — Mohammed Waliullah
(74) *Attorney, Agent, or Firm* — Chamberlain, Hrdlicka, White, Williams & Aughtry; Aly Dossa

(57) ABSTRACT

A data encryption, decryption, and storage method includes: receiving a first query request to retrieve a production data; obtaining a constructed data and encrypting the constructed data using the production data to obtain an encrypted constructed data where the encrypted constructed data is generated without including metadata specifying an access list specifying one or more users and types of users that are able to access the encrypted constructed data; and generating decryption instructions using the production data and storing the decryption instructions with the encrypted constructed data.

11 Claims, 6 Drawing Sheets

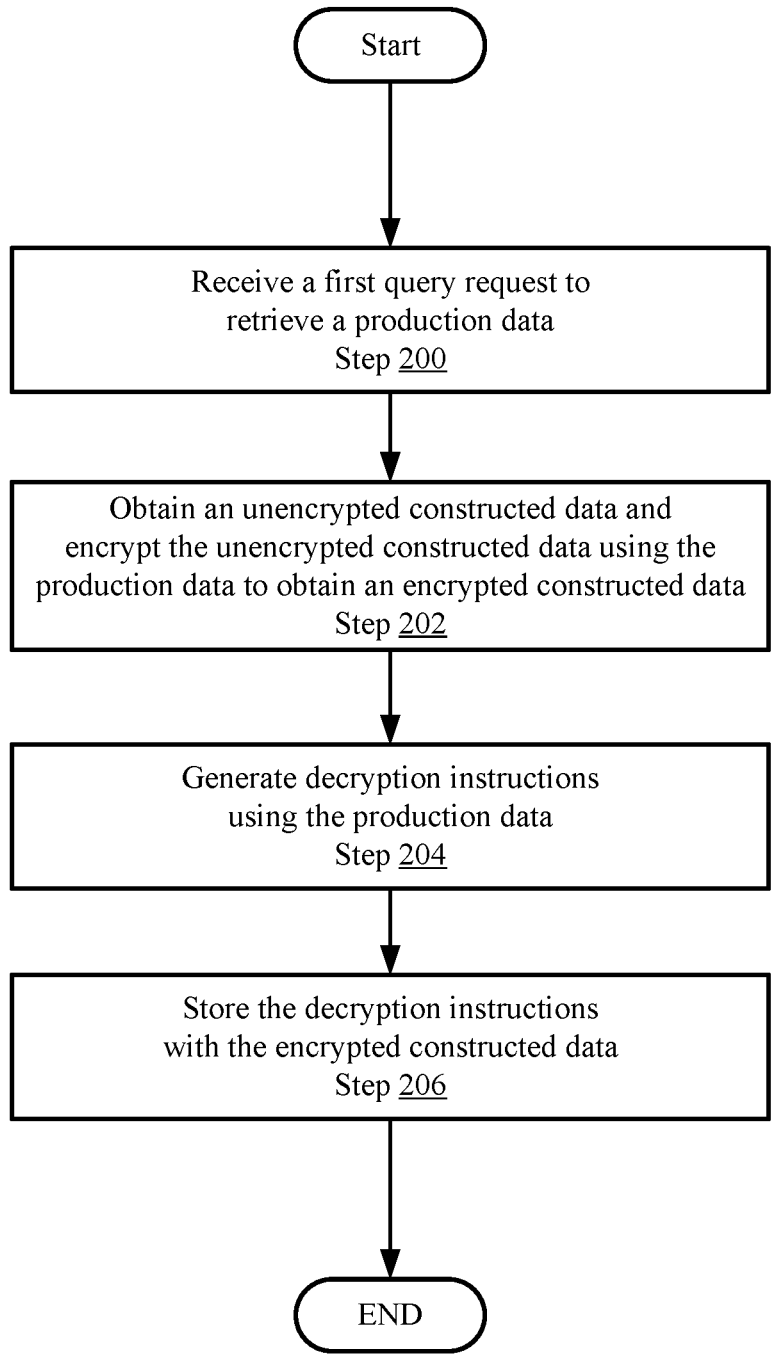
FIG. 2.1

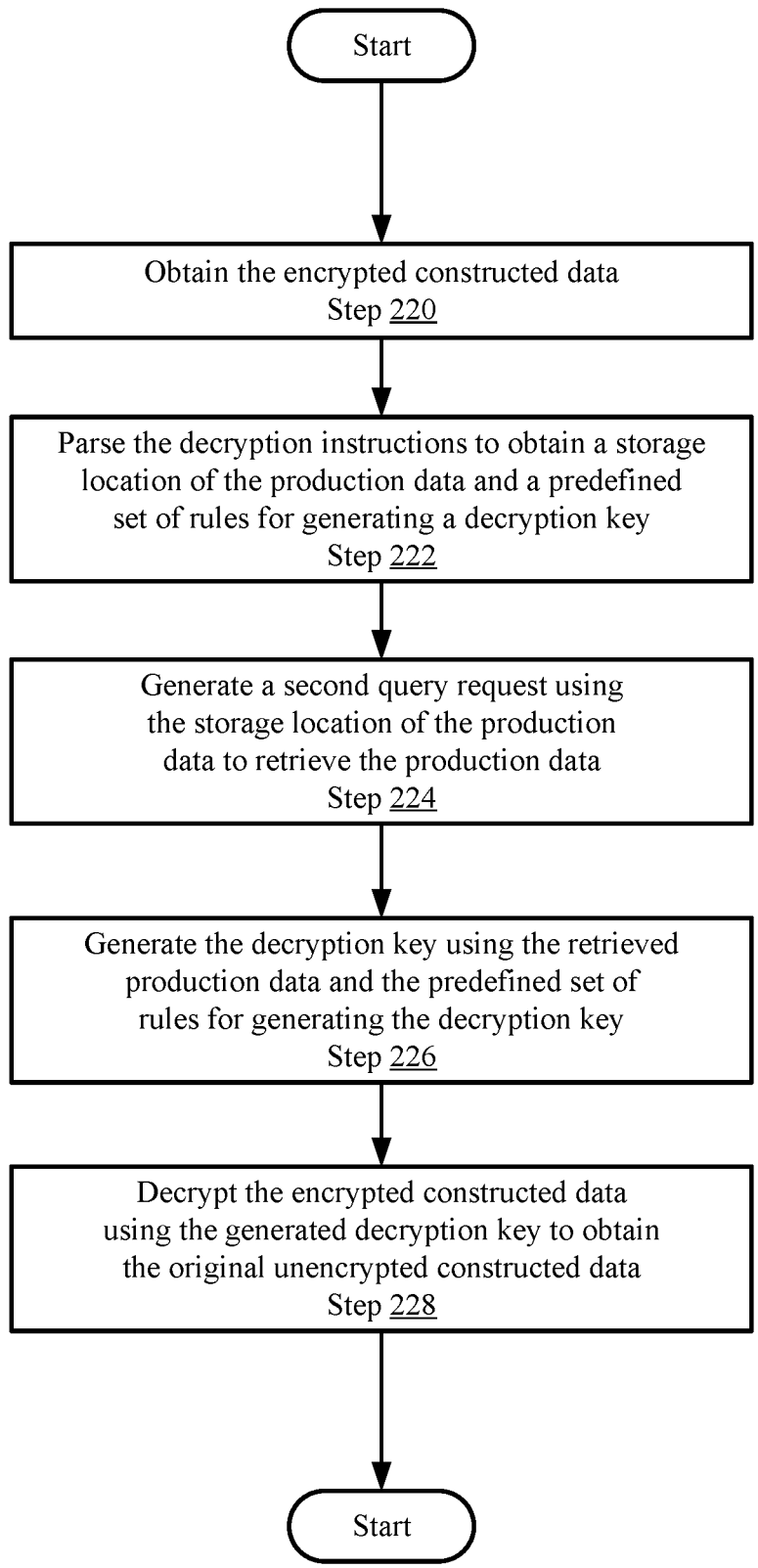
FIG. 2.2

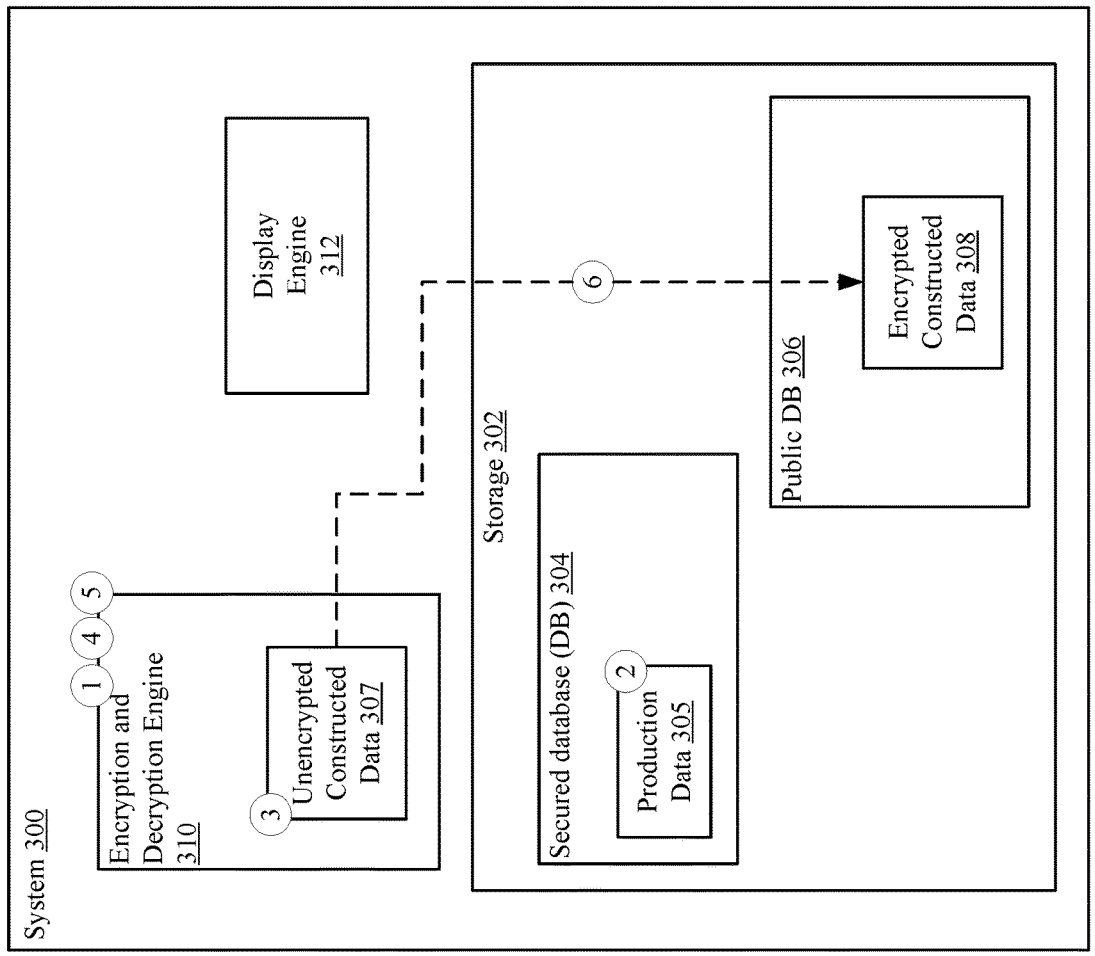
FIG. 3.1

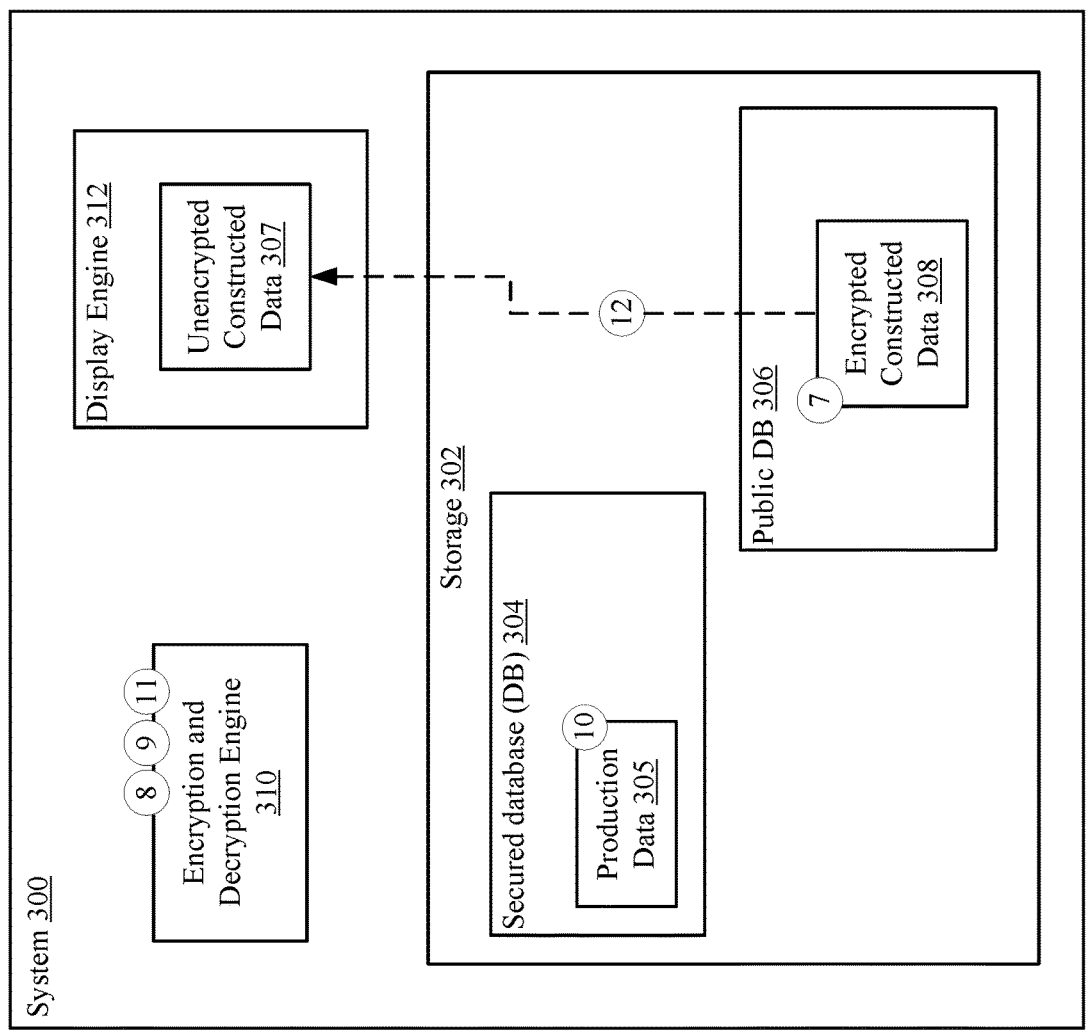
FIG. 3.2

SYSTEM AND METHOD FOR ENCRYPTED STORAGE OF CONSTRUCTED DATA

BACKGROUND

Access to certain types of data may be tightly controlled due to the sensitivity and/or confidentiality of the data. Access lists granting certain individuals permission to access these types of data may be created. However, management and sharing of such access lists can become complicated when large amounts of data are being shared between users.

BRIEF DESCRIPTION OF DRAWINGS

Certain embodiments of this disclosure will be described with reference to the accompanying drawings. However, the accompanying drawings illustrate only certain aspects or implementations of one or more embodiments disclosed herein by way of example and are not meant to limit the scope of the claims.

FIGS. 2.1 and 2.2 show flowcharts in accordance with one or more embodiments described herein.

FIGS. 3.1 and 3.2 show an implementation example in accordance with one or more embodiments described herein.

DETAILED DESCRIPTION

Figure 1:
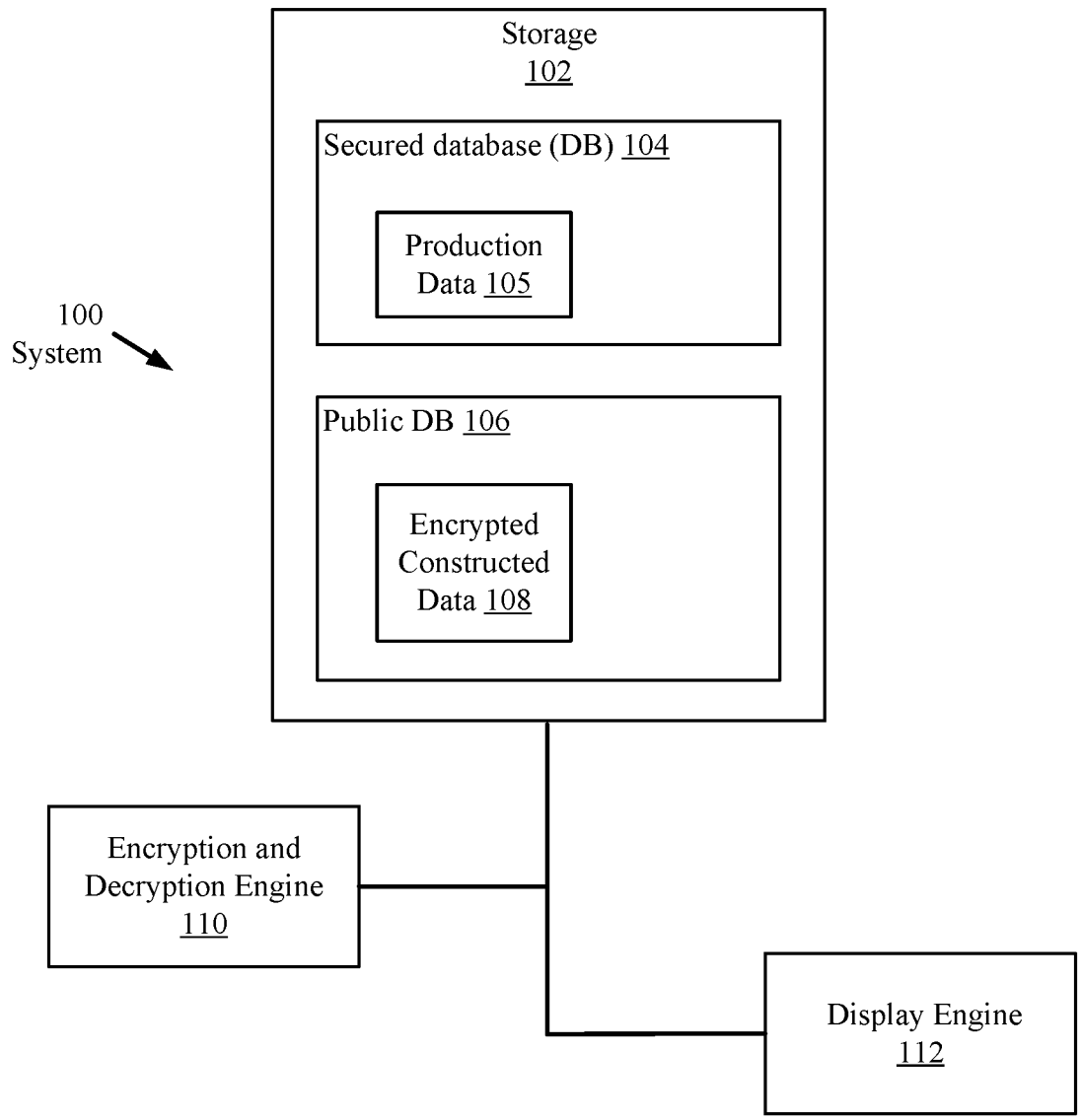
FIG. 1 shows a system in accordance with one or more embodiments described herein.

Specific embodiments will now be described with reference to the accompanying figures.

In the description below, numerous details are set forth as examples of embodiments described herein. It will be understood by those skilled in the art, that have the benefit of this Detailed Description, that one or more embodiments described herein may be practiced without these specific details and that numerous variations or modifications may be possible without departing from the scope of the embodiments described herein. Certain details known to those of ordinary skill in the art may be omitted to avoid obscuring the description.

In the description of the figures below, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components.

Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Lexicographic definitions of one or more terms used below are now discussed. In particular, in the context of one or more embodiments disclosed herein, the term "constructed data" is specifically defined as "data generated using production data." More specifically, constructed data may be data generated using production data (discussed in more detail below) as a result of the processing, application of analytics, and/or consumption of production data to generate new data. A single instance of constructed data may be generated from a single instance of production data. A single instance of constructed data may also be generated from multiple instances of production data. Multiple instances of constructed data may also be generated from a single or multiple instances of production data.

Turning now to one or more embodiments disclosed herein, initially, sensitive and confidential data (e.g., production data) may be stored with one or more access lists specifying users and/or types of users (e.g., users with specific credentials and/or permission levels) that are able to access these types of data. Access to data created from such sensitive and confidential data (e.g., constructed data) also needs to be regulated. However, in certain systems, access lists included in production data may not be easily extendable to the constructed data. Even in the case where access to the constructed data is given manually, later users who want access would also have to be added manually. This disadvantageously creates a bottleneck in the user's pipelines if the original creator of the production data cannot be found (e.g., the original creator is no longer employed with a company).

In view of these inconveniences and complications, one or more embodiments disclosed herein are directed to systems and methods that improve the encryption, decryption, and storage of constructed data. In particular, in one or more embodiments, constructed data is not stored and/or provided with any access lists. Rather, constructed data is encrypted using one or more pieces of data included in production data used to generate the constructed data. Instructions for finding the production data used to encrypt the constructed data are also stored with the encrypted version of the constructed data (herein referred to as "encrypted constructed data"). As a result, as long as users know which production data to use and have access to (e.g., permission to access) that production data, users will be able to decrypt and use the encrypted constructed data. This advantageously prevents the need to extend one or more access lists associated with production data to one or more constructed data generated from the production data.

Various embodiments of the disclosure are described below.

FIG. 1 shows a system (100) in accordance with one or more embodiments. The system includes a storage (102), and encryption and decryption engine (110), and a display engine (112). In one or more embodiments disclosed herein, the system (100) may be part of a computing system (e.g., 400, FIG. 4). Each of these components of the system (100) will be described in more detail below.

As shown in FIG. 1, the system (100) includes the storage (102). The storage (102) may be implemented using volatile or non-volatile storage or any combination thereof. The storage (102) is configured to store a secured database (DB) (104) and a public database (106).

In one or more embodiments, the secured DB (104) may be an extent of the storage (102). Said another way, the secured DB (104) may be a contiguous area of the storage (102) reserved (e.g., partitioned) for one or more files and data. The secured DB (104) may be configured such that only users with authorization to access the secured DB (104) may access one or more files and data stored in the secured DB (104). For example, prior to accessing the secured DB (104), the system (100) may require a user to enter a user name and password previously allocated to the user. Alternatively, the system (100) may check pre-stored information (e.g., an access list for the secured BD (104), user credentials, etc.) to determine whether the user has permission (e.g., authorization) to access the secured database.

In one or more embodiments, the secured DB (104) may be separate and distinct from the storage (102). For example, the secured DB (104) may be its own independent entity (physical or virtual) implemented using volatile or non-volatile storage or any combination thereof.

In one or more embodiments, one or more production data (105) may be stored in the secured DB (104). In the context of one or more embodiments disclosed herein, the term "production data" may refer to "data that is essential to completing day-to-day business tasks and processes." For example, production data may include information that includes, but is not limited to: an entity's (e.g., company's) supply chain; credit card number of an entity's customers; settings database tables specifying how one or more applications work, etc. A person having ordinary skill in the art would appreciate that forms and examples of production data are not limited to those discussed above, and that other forms and examples of production data such as, but are not limited to, client data, production data, end user data, and customer data may exist.

In one or more embodiments, the production data (105) may be stored with an access list identical to the access list of the secured DB (104). Said another way, a user that is able to access the secured DB (104) will also be able to access the contents of the production data (105). Alternatively, the production data (105) may be stored with an access list different from the access list of the secured DB (104).

In one or more embodiments, the public DB (106) may be also be an extent of the storage (102). Said another way, the public DB (106) may be a contiguous area of the storage (102) reserved (e.g., partitioned) for one or more files and data. In one or more embodiments, the contiguous area of the storage (102) reserved for the public DB (106) is different from the above-discussed contiguous area of the storage (102) reserved for the secured DB (104). Additionally, in the context of one or more embodiments disclosed herein, the public DB (106) may only be public for users associated with an entity (e.g., employees of a company), but not accessible for individuals not associated with the entity (e.g., clients, third party vendors, etc.). For example, the public DB (106) may be provisioned behind a firewall and/or other forms of security measures that blocks access to individuals not associated with the entity.

In one or more embodiments, similar to the secured DB (104), the public DB (106) may be separate and distinct from the storage (102). For example, the public DB (106) may be its own independent entity (physical or virtual) implemented using volatile or non-volatile storage or any combination thereof.

In one or more embodiments, one or more of the above-discussed constructed data may be stored in the public DB (106). The constructed data may be stored in an encrypted from (also referred to herein as "encrypted constructed data (108)"). The encrypted constructed data (108) stored in the public DB (108) does not include any access lists (either stored separately but linked with the encrypted constructed data (108) or as part of metadata included in the encrypted constructed data (108)).

In one or more embodiments, the encrypted constructed data (108) may be stored with decryption instructions (not shown). The decryption instructions may be stored in a separate and distinct file that is stored with (e.g., in the same location in the public DB (106)) the encrypted constructed data (108). The decryption instructions may also be stored as part of metadata making up the encrypted constructed data (108). Additional details of the decryption instructions are discussed below in reference to FIGS. 2.1 and 2.2.

In one or more embodiments, the system (100) further includes the encryption and decryption engine (110). The encryption and decryption engine (110) may be implemented in hardware (i.e., circuitry), software, or any combination thereof. In one or more embodiments, the encryption and decryption engine (110) may be configured to implement one or more encryption, decryption and storage processes discussed below in FIGS. 2.1 and 2.2 on one or more constructed data (e.g., the above-discussed encrypted constructed data (108) and one or more unencrypted versions of the encrypted constructed data (also referred to herein as "unencrypted constructed data")).

In one or more embodiments disclosed herein, the system (100) further includes the display engine (112). The display engine (112) may be implemented in hardware (i.e., circuitry), software, or any combination thereof. In one or more embodiments, the display engine (112) may be configured to display (e.g., on a display of the computing device shown in FIG. 4) contents of any of the stored data (e.g., the above-discussed production data (105), unencrypted constructed data, and encrypted constructed data (108)) and the decryption instructions to a user.

Although the system (100) is shown as having three components (102, 110, and 112), in other embodiments, the system (100) may have more or fewer components. Further, the functionality of each component described above may be split across components or combined into a single component (e.g., the functionalities of the encryption and decryption engine (110) and the display engine (114) may be combined to be implanted by a single component. Further still, each component (102, 110, and 112) may be utilized multiple times to carry out an iterative operation.

Turning now to FIGS. 2.1 and 2.2, FIGS. 2.1 and 2.2 show flowcharts in accordance with one or more embodiments disclosed herein. The methods depicted in FIGS. 2.1 and 2.2 may be performed to encrypt and/or decrypt and store one or more constructed data. The methods shown in FIGS. 2.1 and 2.2 may be performed, for example, by a combination of the encryption and decryption engine (e.g., 110, FIG. 1) and the display engine (e.g., 114, FIG. 1). Other components of the system in FIG. 1 may perform all, or a portion, of the methods of FIGS. 2.1 and 2.2 without departing from the scope of one or more embodiments described herein.

While FIGS. 2.1 and 2.2 are illustrated as a series of steps, any of the steps may be omitted, performed in a different order, additional steps may be included, and/or any or all of the steps may be performed in a parallel and/or partially overlapping manner without departing from the scope of the embodiments described herein.

Starting with FIG. 2.1, FIG. 2.1 shows a flowchart of a constructed data encryption and storage process. More specifically, initially, in Step 200 of FIG. 2.1, a query request (herein referred to as a "first query request") is received to retrieve one or more production data (e.g., 105, FIG. 1). In one or more embodiments, the first query request may be received from a user who generated an unencrypted constructed data that wishes to encrypt the unencrypted constructed data. The first query request may be received to retrieve the production data from the secured DB (e.g., 104, FIG. 1).

In Step 202, in one or more embodiments, an unencrypted constructed data may be obtained. Additionally, the unencrypted constructed data may be encrypted using the production data retrieved in Step 200 to obtain an encrypted constructed data.

More specifically, in one or more embodiments, the same user who submitted the first query request may input additional instructions for the system (e.g., 100, FIG. 1) to obtain the unencrypted constructed data from the user's personal and/or company-issued computing device. Alternatively, the user may transmit the unencrypted constructed data from his or her personal and/or company-issued computing device. As discussed above, the obtained unencrypted constructed data may be generated by the user who submitted the first query request. In one or more embodiments, the unencrypted constructed data may also be obtained from any other source (e.g., an external hard drive owned by the user, downloaded from a network storage device that is configured to only be accessible to the user, etc.).

In one or more embodiments, to encrypt the unencrypted constructed data, the system may receive (e.g., from the user) encryption instructions generated based on the production data retrieved in Step 200. More specifically, after the production data is retrieved in Step 200, an encryption key (also referred to herein as "a decryption key") may be generated based on a predefined set of rules set by the user. The predefined set of rules may be based on one or more information stored in the production data retrieved in Step 200. For example, assume that the production data retrieved in Step 200 includes a data table with multiple entries. The encryption key generated using this production data may be, but is not limited to: the concatenation of the first added dates of five (5) different entries in the production data; the hash of the first 5 rows of the entries; etc. Other examples of encryption keys generated from a production data may include, but are not limited to: the identification (ID) of one or more users who created the production data; the hash of the first five (5) rows of a setting table stored with the production data; etc. In general, one of ordinary skill in the art would appreciate that any type of encryption key may be created as long as another user is able to use the contents of the production data (e.g., metadata and/or actual content) to figure out (e.g., obtain) the encryption key. Further, example properties to be considered while generating an encryption key may include, but are not limited to: (i) the key should be easy to find; (ii) the key must be difficult to guess; and (iii) the key should be should be unlikely to change.

In one or more embodiments, once the encryption key is generated, the unencrypted constructed data is encrypted using the encryption key to obtain an encrypted constructed data.

In Step 204, decryption instructions for decrypting the encrypted constructed data are generated. In one or more embodiments, the decryption instructions may be generated using the production data retrieved in Step 200.

More specifically, in one or more embodiments, the decryption instructions may include one or more of information including, but not limited to: instructions for finding the production data retrieved in Step 200 from the secured DB; instructions for generating the decryption key using the contents of the production data (e.g., the above-discussed predefined set of rules for generating the decryption key); etc. In one or more embodiments, the instructions for finding the production data may be in the form of a query string that can be used to retrieve the production data from the secured DB. The instructions for finding the production data may also be in the form of a file path specifying a storage location of the production data in the secured DB.

In one or more embodiments, the instructions for generating the decryption key using the contents of the production data may be one or more pieces of information that would allow another user to be able to figure out the decryption key using the contents of the production data. For example, the instructions may be in the form of, but is not limited to: explicit instructions such as "use the concatenation of the first added dates of five (5) different entries in the production data"; hash the first five (5) rows of a setting table included with the production data; etc. In one or more embodiments, the instructions may be presented in any form and format as long as another user is able to use the instructions to figure out the content of the decryption key.

In Step 206, the decryption instructions are stored with the encrypted constructed data. The decryption instructions and the encrypted decryption data may be stored in the public DB. In one or more embodiments, as discussed above, the decryption instructions may be stored in a separate and distinct file that is stored with (e.g., in the same location in the public DB (106)) the encrypted constructed data (108). The decryption instructions may also be stored as part of metadata making up the encrypted constructed data (108).

Turning now to FIG. 2.2, FIG. 2.2 shows a flowchart of an encrypted constructed data decryption process. More specifically, initially, in Step 220, and encrypted constructed data may be obtained. In one or more embodiments, for example, the obtained encrypted constructed data may be the same encrypted constructed data stored in Step 206 of FIG. 1. Alternatively, the encrypted constructed data may be a different encrypted constructed data that may be obtained from any source (e.g., the public DB, an external hard drive, downloaded from a network storage device, etc.).

In one or more embodiments, the same or a different user from the user who generated the encrypted constructed data may be obtaining the encrypted constructed data in Step 220 of FIG. 2.2.

In Step 222, after obtaining the encrypted constructed data, the decryption instructions stored together with the encrypted constructed data is parsed to obtain at least: (i) a storage location of a production data; and (ii) the predefined set of rules for generating the decryption key.

As discussed above in Step 204 of FIG. 2.1, in one or more embodiments, the storage location of a production data may be in the form of the instructions for finding the production data in the secured DB. For example, the instructions for finding the production data may be in the form of a query string that can be used to retrieve the production data from the secured DB. The instructions for finding the production data may also be in the form of a file path specifying a storage location of the production data in the secured DB.

Additionally, as also discussed above in Steps 202 and 204 of FIG. 2.1, in one or more embodiments, the predefined set of rules for generating the decryption key may be instructions for generating the decryption key based on one or more information stored in the production data to be retrieved using the storage location of the production data included in the decryption instructions.

In Step 224, query request (herein referred to as a "second query request") is generated using the storage location of the production data to retrieve the production data from the secured DB. In one or more embodiments, the retrieved production data is the production data (or one or multiple production data) that was used to generate the encrypted constructed data.

In Step 226, the decryption key is generated using the production data retrieved in Step 224 and the predefined set of rules for generating the decryption key included in the decryption instructions. Finally, in Step 228, the encrypted constructed data is decrypted using the generated decryption key to obtain the original unencrypted version of the encrypted constructed data. Once the unencrypted constructed data is obtained, the system may display the contents of the unencrypted constructed data to the user that decrypted the encrypted constructed data.

FIGS. 3.1 and 3.2 show an implementation example in accordance with one or more embodiments. In particular, FIGS. 3.1 and 3.2 shows an example of the encryption, storage, and decryption of constructed data. The numbers in the brackets below, e.g., "[1]", correspond to the same circled numbers in FIGS. 3.1 and 3.2.

Beginning of Example

Initially, as shown in FIG. 3.1, a first query request is received by the encryption and decryption engine (310) (e.g., 110, FIG. 1) of the system (300) (e.g., 100, FIG. 1) [1]. In response to receiving the first query request, the encryption and decryption engine (310) retrieved a production data (305) specified in the first query request from the secured DB (304) (e.g., 104, FIG. 1) [2]. Simultaneously with (or after) the retrieval of the production data (305) (e.g., 105, FIG. 1), an unencrypted constructed data (307) generated using the retrieved production data (305) is obtained (or provided by) a user who submitted the first query request [3].

The encryption and decryption engine (310) then encrypts the unencrypted constructed data (307) using the retrieved production data (305) [4]. Once the unencrypted constructed data (307) is encrypted, the encryption and decryption engine (310) generates decryption instructions based on the retrieved production data (305) [5]. The encrypted constructed data (308) (e.g., 108, FIG. 1) and the decryption instructions are then stored in the public DB (306) (e.g., 106, FIG. 1) [6].

Turning now to FIG. 3.2, after some time has elapsed since point [6] in FIG. 3.1, a different (or same) user may send a request to the encryption and decryption engine (310) to obtain the encrypted constructed data (308) [7].

The encryption and decryption engine (310) then parses the obtained encrypted constructed data (308) to obtain the decryption instructions stored with the encrypted constructed data (308) [8]. Using the obtained decryption instructions, the encryption and decryption engine (310) generates a second query request to retrieve the production data (305) from the secured DB (304) [9]. The production data (305) is retrieved from the secured DB (304) in response to the second query request [10].

Finally, the encryption and decryption engine (310) uses the retrieved production data (305) and the decryption instructions (namely, the predefined set of rules for generating the decryption key) to generate a decryption key for decrypting the encrypted constructed data (308) [11]. The generated decryption keys is then used to decrypt the encrypted constructed data (308) to obtain the original unencrypted constructed data (307), and the unencrypted constructed data (307) is transmitted to the user's personal and/or company-issued computing device while also being displayed on a display to the user [12].

End of Example

Figure 4:
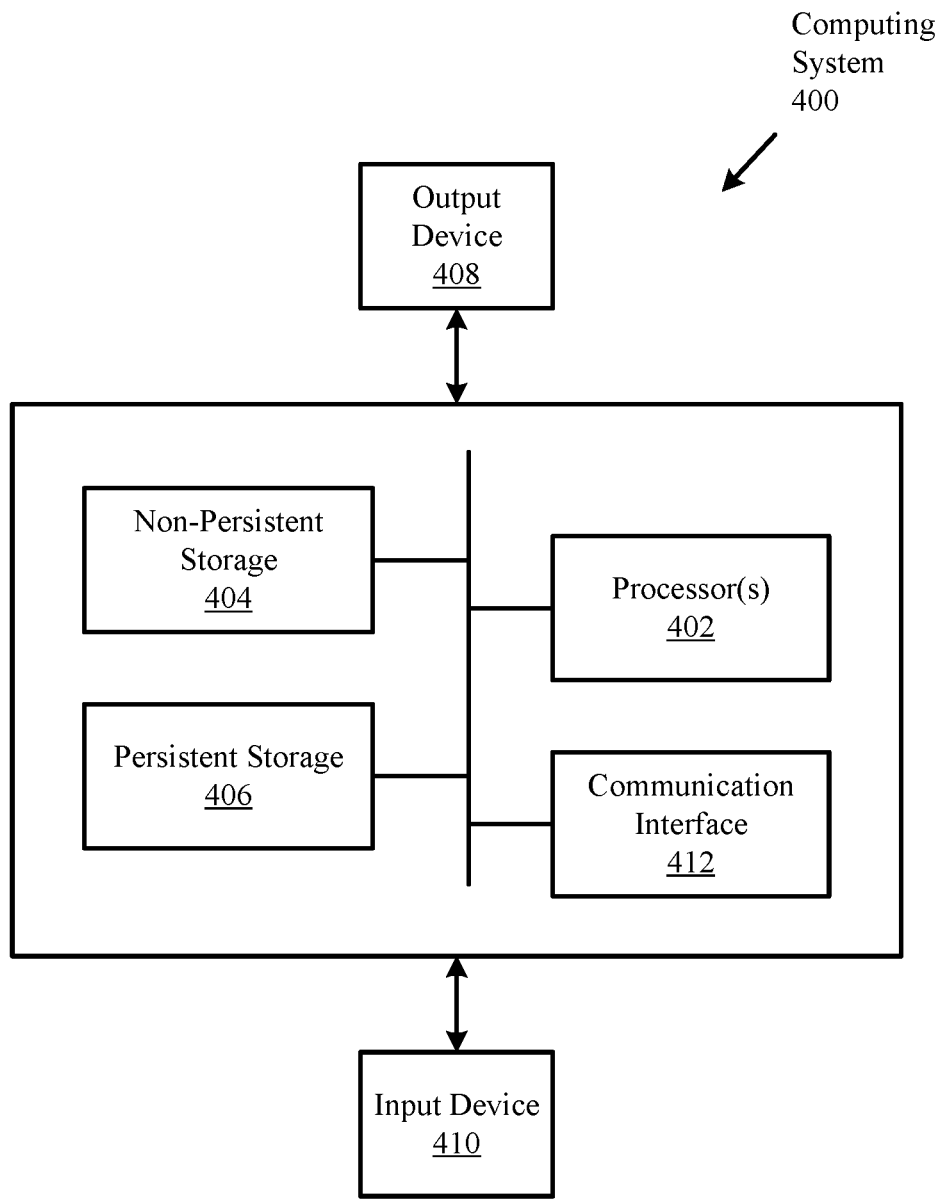
FIG. 4 shows a computer system in accordance with one or more embodiments described herein.

FIG. 4 shows a computer system in accordance to one or more embodiments.

Embodiments disclosed herein may be implemented using computing devices and/or computing systems. FIG. 4 shows a diagram of a computing device in accordance with one or more embodiments disclosed herein. Computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, computer processor(s) (402) may be an integrated circuit for processing instructions. For example, the computer processor(s) may be one or more cores or micro-cores of a processor. Computing system (400) may also include one or more input devices (410), such as a touchscreen, keyboard, mouse, microphone, touchpad, electronic pen, or any other type of input device. Further, communication interface (412) may include an integrated circuit for connecting computing system (400) to a network (not shown) (e.g., a local area network (LAN), a wide area network (WAN) such as the Internet, mobile network, or any other type of network) and/or to another device, such as another computing system.

In one embodiment disclosed herein, computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (402), non-persistent storage (404), and persistent storage (406). Many different types of computing devices exist, and the aforementioned input and output device(s) may take other forms.

The problems discussed throughout this application should be understood as being examples of problems solved by one or more embodiments disclosed herein and the one or more embodiments disclosed herein should not be limited to solving the same/similar problems. In particular, one or more embodiments disclosed herein are broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A data encryption, decryption, and storage method comprising:
   receiving a first query request to retrieve a production data, wherein the production data is stored in a secured database;
   obtaining an unencrypted constructed data and encrypting the unencrypted constructed data using the production data to obtain an encrypted constructed data, wherein the encrypted constructed data is generated without including metadata specifying an access list specifying one or more users and types of users that are able to access the encrypted constructed data and wherein encrypting the unencrypted constructed data using the production data to obtain the encrypted constructed data comprises:
      generating a decryption key using one or more information stored in the production data and a predefined set of rules for generating the decryption key; and
      encrypting the unencrypted constructed data using the decryption key to obtain the encrypted constructed data;
   generating decryption instructions using the production data and storing the decryption instructions with the encrypted constructed data;
   obtaining the encrypted constructed data;
   parsing the decryption instructions to obtain a storage location of the production data in the secured database and the predefined set of rules for generating the decryption key;
   generating a second query request using the storage location of the production data to retrieve the production data from the secured database;
   generating the decryption key using the retrieved production data and the predefined set of rules for generating the decryption key; and
   decrypting the encrypted constructed data using the generated decryption key.

2. The method of claim 1, wherein the encrypted constructed data is stored without being associated with a separately stored access list specifying one or more users and types of users that are able to access the encrypted constructed data.

3. The method of claim 1,
   wherein the first query request is submitted by a first user and the second query request is submitted by a second user different from the first user, and
   wherein the first user and the second user both have pre-existing authorization for accessing the secured database.

4. The method of claim 3, wherein the second user is unaware of a storage location of production data in the secured database until a parsing of the decryption instructions to obtain the storage location of the production data.

5. The method of claim 1, wherein the unencrypted constructed data is generated using the production data.

6. A non-transitory computer readable medium (CRM) comprising computer readable program code, which when executed by a computer processor enables the computer processor to perform a data encryption, decryption, and storage method, the data encryption, decryption, and storage comprising:
   receiving a first query request to retrieve a production data, wherein the production data is stored in a secured database;
   obtaining an unencrypted constructed data and encrypting the unencrypted constructed data using the production data to obtain an encrypted constructed data, wherein the encrypted constructed data is generated without including metadata specifying an access list specifying one or more users and types of users that are able to access the encrypted constructed data and wherein encrypting the unencrypted constructed data using the production data to obtain the encrypted constructed data comprises:
      generating a decryption key using one or more information stored in the production data and a predefined set of rules for generating the decryption key; and
      encrypting the unencrypted constructed data using the decryption key to obtain the encrypted constructed data;
   generating decryption instructions using the production data and storing the decryption instructions with the encrypted constructed data;
   obtaining the encrypted constructed data;
   parsing the decryption instructions to obtain a storage location of the production data in the secured database and the predefined set of rules for generating the decryption key;
   generating a second query request using the storage location of the production data to retrieve the production data from the secured database;
   generating the decryption key using the retrieved production data and the predefined set of rules for generating the decryption key; and
   decrypting the encrypted constructed data using the generated decryption key.

7. The CRM of claim 6, wherein the encrypted constructed data is stored without being associated with a separately stored access list specifying one or more users and types of users that are able to access the encrypted constructed data.

8. The CRM of claim 6,
   wherein the first query request is submitted by a first user and the second query request is submitted by a second user different from the first user,
   wherein the first user and the second user both have pre-existing authorization for accessing the secured database, and
   wherein the second user is unaware of a storage location of production data in the secured database until a parsing of the decryption instructions to obtain the storage location of the production data.

9. A system comprising:
   a secured database;
   a public database; and
   a processor coupled to the secured database and the public database, wherein the processor is configured to execute a data encryption, decryption, and storage method comprising:
      receiving a first query request to retrieve a production data, wherein the production data is stored in the secured database;
      obtaining an unencrypted constructed data and encrypting the unencrypted constructed data using the production data to obtain an encrypted constructed data, wherein the encrypted constructed data is generated without including metadata specifying an access list specifying one or more users and types of users that are able to access the encrypted constructed data and wherein encrypting the unencrypted constructed data using the production data to obtain the encrypted constructed data comprises:

generating a decryption key using one or more information stored in the production data and a predefined set of rules for generating the decryption key; and encrypting the unencrypted constructed data using the decryption key to obtain the encrypted constructed data;

generating decryption instructions using the production data and storing the decryption instructions with the encrypted constructed data in the public database;

obtaining the encrypted constructed data;

parsing the decryption instructions to obtain a storage location of the production data in the secured database and the predefined set of rules for generating the decryption key;

generating a second query request using the storage location of the production data to retrieve the production data from the secured database;

generating the decryption key using the retrieved production data and the predefined set of rules for generating the decryption key; and decrypting the encrypted constructed data using the generated decryption key.

10. The system of claim 9, wherein the encrypted constructed data is stored in the public database without being associated with a separately stored access list specifying one or more users and types of users that are able to access the encrypted constructed data.

11. The system of claim 9, wherein the first query request is submitted by a first user and the second query request is submitted by a second user different from the first user, wherein the first user and the second user both have pre-existing authorization for accessing the secured database, and wherein the second user is unaware of a storage location of production data in the secured database until a parsing of the decryption instructions to obtain the storage location of the production data.

* * * * *